United States Patent
Hu et al.

(10) Patent No.: US 12,038,682 B2
(45) Date of Patent: Jul. 16, 2024

(54) OPTICAL SYSTEM

(71) Applicant: TDK TAIWAN CORP., Taoyuan (TW)

(72) Inventors: Chao-Chang Hu, Taoyuan (TW);
Che-Wei Chang, Taoyuan (TW);
Chih-Wen Chiang, Taoyuan (TW);
Chen-Er Hsu, Taoyuan (TW); Fu-Yuan Wu, Taoyuan (TW); Shou-Jen Liu, Taoyuan (TW); Chih-Wei Weng, Taoyuan (TW); Mao-Kuo Hsu, Taoyuan (TW); Hsueh-Ju Lu, Taoyuan (TW); Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 556 days.

(21) Appl. No.: 16/728,639

(22) Filed: Dec. 27, 2019

(65) Prior Publication Data

US 2020/0209513 A1 Jul. 2, 2020

Related U.S. Application Data

(60) Provisional application No. 62/785,593, filed on Dec. 27, 2018.

(30) Foreign Application Priority Data

Dec. 20, 2019 (EP) .................................... 19218902

(51) Int. Cl.
*G03B 3/10* (2021.01)
*G02B 3/12* (2006.01)
(Continued)

(52) U.S. Cl.
CPC ................. *G03B 3/10* (2013.01); *G02B 3/12* (2013.01); *G02B 7/023* (2013.01); *G02B 7/1828* (2013.01);
(Continued)

(58) Field of Classification Search
CPC .... G02B 26/004; G02B 7/026; G02B 27/646; G02B 7/025; G02B 7/023; G02B 7/1828;
(Continued)

(56) References Cited

U.S. PATENT DOCUMENTS

| | | | |
|---|---|---|---|
| 6,365,975 B1 * | 4/2002 | DiStefano | H01L 23/498 257/E23.06 |
| 2013/0039640 A1 | 2/2013 | Sekimoto | |

(Continued)

FOREIGN PATENT DOCUMENTS

| | | | | |
|---|---|---|---|---|
| CN | 105785549 A | * | 7/2016 | |
| WO | WO-2007133013 A1 | * | 11/2007 | ............. G02B 7/023 |

OTHER PUBLICATIONS

English translation for CN105785549A (Year: 2016).*

*Primary Examiner* — Thomas K Pham
*Assistant Examiner* — Kuei-Jen L Edenfield
(74) *Attorney, Agent, or Firm* — MUNCY, GEISSLER, OLDS & LOWE, PC

(57) ABSTRACT

An optical system is provided and includes a fixed assembly, a movable element and a driving module. The fixed assembly has a main axis. The movable element is movable relative to the fixed assembly and coupled to a first optical element. The driving module is configured to drive the movable element to move relative to the fixed assembly. The driving module includes a first driving assembly and a second driving assembly, and the first driving assembly and the second driving assembly are individually operable.

18 Claims, 13 Drawing Sheets

(51) Int. Cl.
*G02B 7/02* (2021.01)
*G02B 7/09* (2021.01)
*G02B 7/182* (2021.01)
*G02B 26/00* (2006.01)
*G02B 27/64* (2006.01)
*G03B 5/00* (2021.01)
*G03B 5/02* (2021.01)
*G03B 13/36* (2021.01)
*H04N 23/57* (2023.01)
*H04N 23/68* (2023.01)

(52) U.S. Cl.
CPC ......... *G02B 26/004* (2013.01); *G02B 27/646* (2013.01); *G03B 5/00* (2013.01); *G03B 5/02* (2013.01); *G03B 13/36* (2013.01); *H04N 23/57* (2023.01); *H04N 23/6812* (2023.01); *H04N 23/687* (2023.01); *G02B 7/09* (2013.01); *G03B 2205/0007* (2013.01); *G03B 2205/0015* (2013.01); *G03B 2205/0069* (2013.01)

(58) Field of Classification Search
CPC ... G02B 3/12; G02B 7/09; G02B 7/08; G02B 3/14; G02B 7/102; G03B 5/00; G03B 13/36; G03B 3/10; G03B 5/02; G03B 2205/0007; G03B 2205/0015; G03B 2205/0069; H04N 5/2257; H04N 23/57; H04N 23/6812; H04N 23/687; H04N 23/54; H04N 23/55
USPC .................................................. 359/554, 544
See application file for complete search history.

(56) References Cited

U.S. PATENT DOCUMENTS

| | | | |
|---|---|---|---|
| 2014/0009631 A1* | 1/2014 | Topliss | H04N 23/687 348/208.11 |
| 2016/0154249 A1* | 6/2016 | Yeo | G03B 3/10 359/557 |
| 2016/0231641 A1* | 8/2016 | Minamisawa | H04N 5/23258 |
| 2018/0059381 A1 | 3/2018 | Sharma et al. | |
| 2021/0055539 A1 | 2/2021 | Hu et al. | |
| 2021/0318593 A1* | 10/2021 | Sharma | H04N 5/23267 |

* cited by examiner

OPTICAL SYSTEM

CROSS REFERENCE TO RELATED APPLICATIONS

This application claims the benefit of U.S. Provisional Application No. 62/785,593, filed Dec. 27, 2018, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical system, and in particular it relates to an optical system having a liquid lens.

Description of the Related Art

As technology has progressed, many kinds of electronic devices such as smartphones have begun to include the functionality of digital photography or video recording. A user can operate the electronic device to capture various images with a camera module that is included in the electronic device.

Today's design of electronic devices continues to move toward the trend of miniaturization so that the various components of the camera module or its structure must also be continuously reduced, so as to achieve the purpose of miniaturization. In general, a driving mechanism of the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can perform autofocus, optical image stabilization, and miniaturization at the same time is a topic nowadays that needs to be discussed and solved.

BRIEF SUMMARY OF THE DISCLOSURE

Accordingly, one objective of the present disclosure is to provide an optical system (camera module) to solve the above problems.

According to some embodiments of the disclosure, an optical system is provided and includes a fixed assembly, a movable element and a driving module. The fixed assembly has a main axis. The movable element is movable relative to the fixed assembly and coupled to a first optical element. The driving module is configured to drive the movable element to move relative to the fixed assembly. The driving module includes a first driving assembly and a second driving assembly, and the first driving assembly and the second driving assembly are individually operable.

According to some embodiments, the optical system further includes a circuit assembly, and the first driving assembly is electrically connected to the second driving assembly via a first conductive element of the circuit assembly.

According to some embodiments, the first conductive element has a first string arm and a second string arm which are respectively connected to the first driving assembly and the second driving assembly.

According to some embodiments, the fixed assembly includes a base, the base has at least one protruding column, and the first conductive element is connected to the protruding column.

According to some embodiments, the optical system further includes a movable assembly, the driving module drives the movable assembly to move relative to the fixed assembly so as to move the movable element, and the movable assembly is movably connected to the fixed assembly by the first conductive element.

According to some embodiments, the circuit assembly further includes a second conductive element, the first driving assembly is electrically connected to the second driving assembly via the second conductive element, and the first conductive element and the second conductive element are respectively disposed at two sides of the first driving assembly and the second driving assembly.

According to some embodiments, the optical system further includes a movable assembly, the driving module drives the movable assembly to move relative to the fixed assembly so as to move the movable element, and the movable assembly is movably connected to the fixed assembly by the first conductive element and the second conductive element.

According to some embodiments, the circuit assembly further includes a circuit member, and the first conductive element and the second conductive element are electrically connected to an external electrical connection portion through the circuit member.

According to some embodiments, the first conductive element is electrically connected to the circuit member through a first electrical connecting point, the second conductive element is electrically connected to the circuit member through a second electrical connecting point, and a shortest distance between the first electrical connecting point and the first optical element is different from a shortest distance between the second electrical connecting point and the first optical element.

According to some embodiments, when viewed along the main axis, the second driving assembly overlaps the external electrical connection portion, and the first driving assembly does not overlap the external electrical connection portion.

According to some embodiments, the driving module further includes a third driving assembly, the circuit assembly further includes a third conductive element, and the second driving assembly is electrically connected to the third driving assembly via the third conductive element.

According to some embodiments, each of the first and third conductive elements has a plate-shaped structure, and when viewed along an extending direction of the first conductive element, the first conductive element at least partially overlaps the third conductive element.

According to some embodiments, the circuit assembly further includes a fourth conductive element, the second driving assembly is electrically connected to the third driving assembly via the fourth conductive element, and the third and fourth conductive elements are respectively disposed at two sides of the second driving assembly and the third driving assembly.

According to some embodiments, the circuit assembly includes a circuit member with a polygonal structure, the first conductive element is electrically connected to the circuit member through a first electrical connecting point, the second conductive element is electrically connected to the circuit member through a second electrical connecting point, the third conductive element is electrically connected to the circuit member through a third electrical connecting point, the fourth conductive element is electrically connected to the circuit member through a fourth electrical connecting point, and the second electrical connecting point and the fourth electrical connecting point are disposed on one side of the circuit member.

According to some embodiments, when viewed along the main axis, the second electrical connecting point and the fourth electrical connecting point are located between the first electrical connecting point and the third electrical connecting point.

According to some embodiments, the optical system further includes a movable assembly, the first conductive element and the third conductive element are disposed on a top surface of the movable assembly, and when viewed along the main axis, the first conductive element does not overlap the third conductive element.

According to some embodiments of the disclosure, the first conductive element has an electrical contact and a narrow portion, the electrical contact is configured to be electrically connected to the first driving assembly, and the narrow portion is adjacent to the electrical contact.

According to some embodiments, the optical system further includes an insulating element which is disposed between the first conductive element and the third conductive element.

According to some embodiments, the insulating element is glue configured to connect the first conductive element, the third conductive element and the movable assembly.

According to some embodiments, the first driving assembly and the second driving assembly respectively include a first circuit element and a second circuit element, and a circuit layout of the first circuit element is different from a circuit layout of the second circuit element.

The present disclosure provides an optical system having a first optical element, a deforming member, a movable element, a fixed assembly, a connecting assembly, a movable assembly, and a driving module. The movable element is configured to be connected to the first optical element through the deforming member, and the movable assembly is connected to the movable element through the connecting assembly. When driving module is configured to drive movable assembly to move relative to fixed assembly, the movable element can be moved to drive the deforming member to push the bottom of first optical element, thereby changing the optical properties of the liquid lens element.

In addition, the circuit layouts of adjacent circuit boards in the driving assembly are symmetrical, and adjacent movable members in movable assembly can share conductive elements, so that the optical system of the present disclosure can achieve simplified mechanism design and the purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
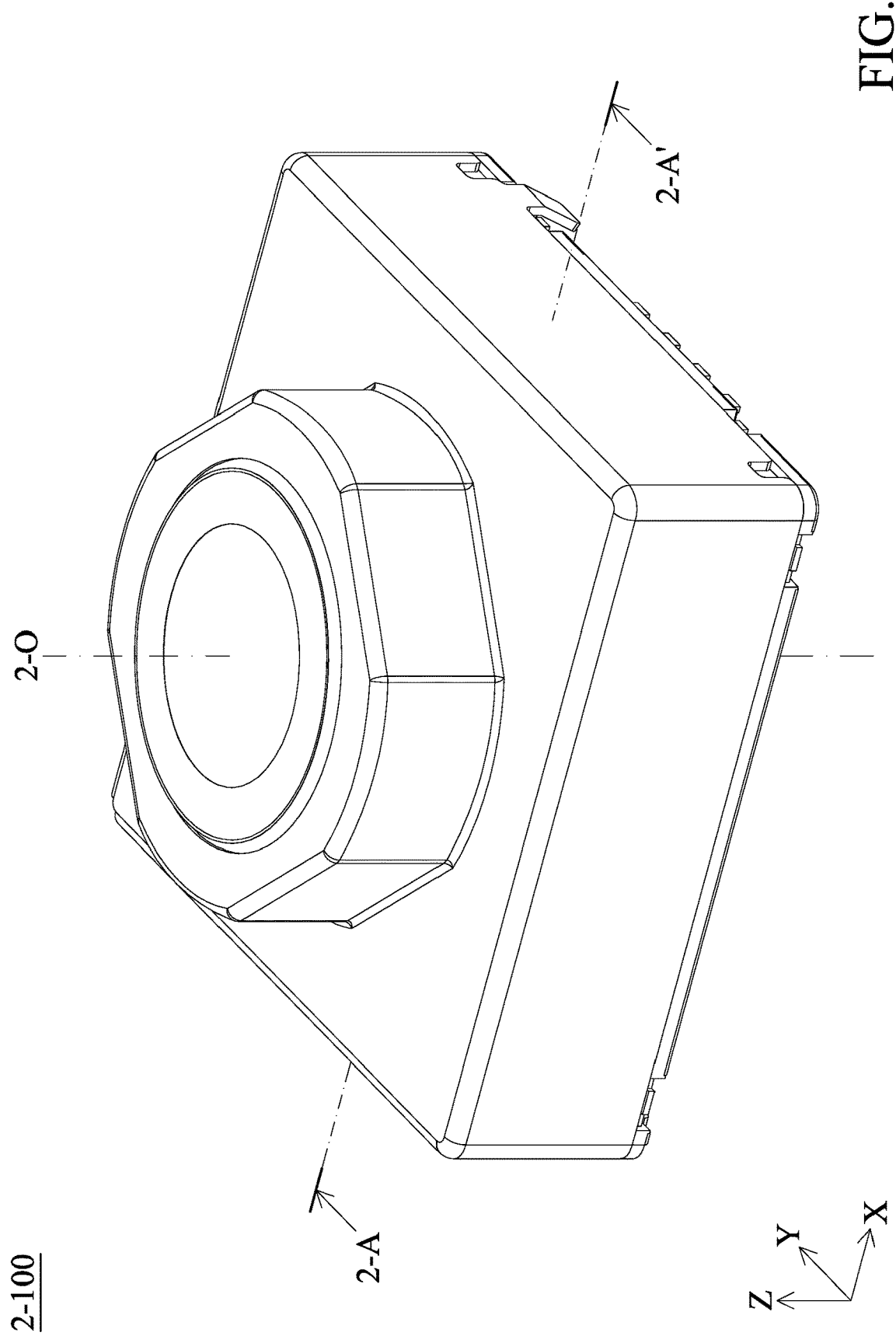
FIG. 1 is a schematic diagram of an optical system 2-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
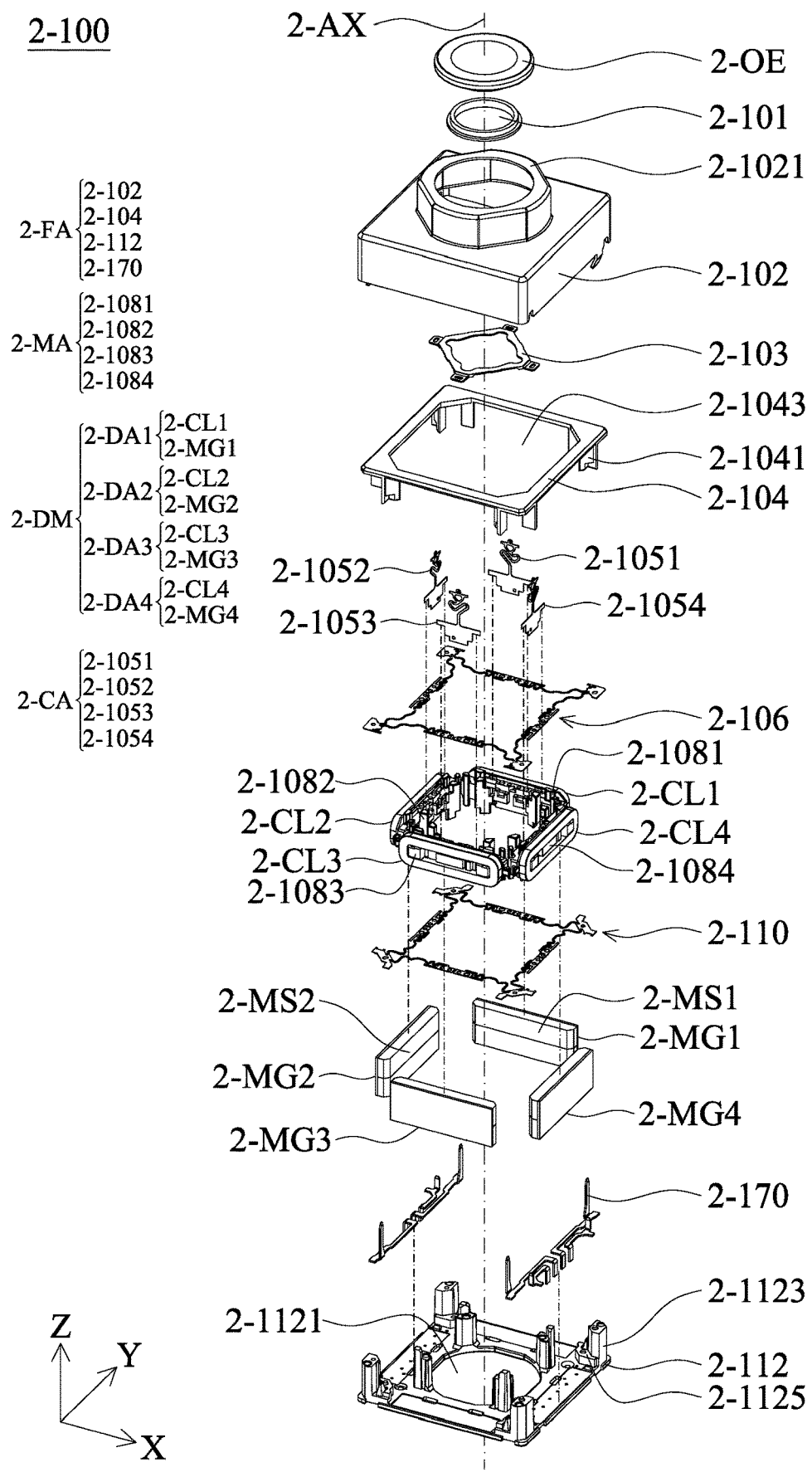
FIG. 2 is an exploded diagram of an optical system 2-100 according to an embodiment of the present disclosure.
Figure 3:
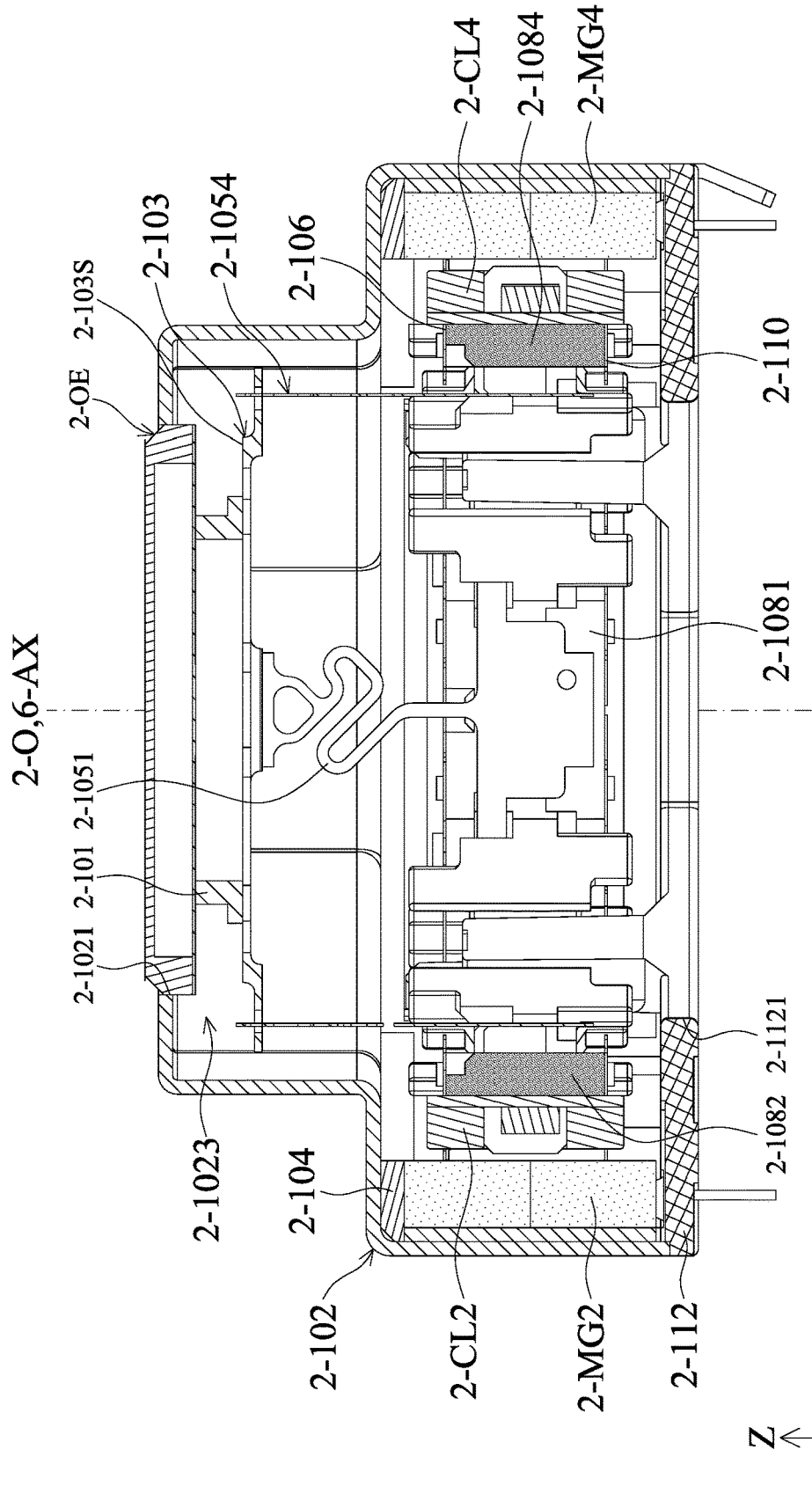
FIG. 3 is a cross-sectional view of the optical system 2-100 along line (2-A)-(2-A') in FIG. 1 according to an embodiment of the present disclosure.

Please refer to FIG. 1 to FIG. 3. FIG. 1 is a schematic diagram of an optical system 2-100 according to an embodiment of the present disclosure, FIG. 2 is an exploded diagram of an optical system 2-100 according to an embodiment of the present disclosure, and FIG. 3 is a cross-sectional view of the optical system 2-100 along line (2-A)-(2-A') in FIG. 1 according to an embodiment of the present disclosure. The optical system 2-100 can be an optical camera system and can be configured to hold and drive a first optical element 2-OE, and the first optical element 2-OE may define an optical axis 2-O. The optical system 2-100 can be installed in different electronic devices or portable electronic devices, such as a smartphone, for allowing a user to perform the image capturing function. In this embodiment, the optical system 2-100 can be a voice coil motor (VCM) with an auto-focusing (AF) function, but it is not limited thereto. In other embodiments, the optical system 2-100 can also perform the functions of auto-focusing and optical image stabilization (OIS).

As shown in FIG. 2, in this embodiment, the optical system 2-100 may include a fixed assembly 2-FA, a deforming member 2-101, a movable element 2-103, and a connecting assembly 2-CA, a movable assembly 2-MA and a driving module 2-DM. The deforming member 2-101 is connected between the movable element 2-103 and the first optical element 2-OE, the movable element 2-103 is movable relative to the fixed assembly 2-FA, and the driving module 2-DM is configured to drive the movable element 2-103 to move relative to the fixed assembly 2-FA. Specifically, the movable assembly 2-MA is movably connected to the movable element 2-103 via the connecting assembly 2-CA, and the driving module 2-DM drives the movable assembly 2-MA to move relative to the fixed assembly 2-FA, thereby driving the movable element 2-103.

In this embodiment, as shown in FIG. 2 and FIG. 3, the fixed assembly 2-FA includes a casing 2-102, a frame 2-104, and a base 2-112. The casing 2-102 is fixedly connected to the base 2-112, and the frame 2-104 can also be fixedly connected to the inner wall surface of the casing 2-102. A main axis 2-AX can be defined by the fixed assembly 2-FA. When the optical system 2-100 is not activated, the main axis 2-AX is parallel to or overlaps an optical axis 2-O of the first optical element 2-OE. In addition, the movable element 2-103 has a movable element surface 2-103S which faces the first optical element 2-OE.

As shown in FIG. 2 and FIG. 3, the aforementioned casing 2-102 has a hollow structure, and a casing opening 2-1021 is formed thereon. A base opening 2-1121 is formed on the base 2-112, The center of the casing opening 2-1021 corresponds to the optical axis 2-O of the first optical element 2-OE, and the base opening 2-1121 corresponds to a photosensitive element (not shown in the figure) disposed below the base 2-112. In this embodiment, the first optical element 2-OE is fixedly disposed in the casing opening 2-1021. The external light can enter the casing 2-102 through the first optical element 2-OE and then is received by the aforementioned photosensitive element after passing through the base opening 2-1121 so as to generate a digital image signal.

Furthermore, the casing 2-102 is disposed on the base 2-112 and may have an accommodating space 2-1023 configured to accommodate the movable element 2-103, the frame 2-104, and the movable assembly 2-MA, the connecting assembly 2-CA, and the driving module 2-DM.

As shown in FIG. 2 and FIG. 3, in this embodiment, the movable assembly 2-MA may include four movable members (a first movable member 2-1081, a second movable member 2-1082, and a third movable member 2-1083 and a fourth movable member 2-1084), and the connecting assembly 2-CA may include four connecting members (a first connecting member 2-1051, a second connecting member 2-1052, a third connecting member 2-1053, and a fourth connecting member 2-1054). The first movable member 2-1081 to the fourth movable member 2-1084 are connected to the movable element 2-103 by the first connecting member 2-1051 to the fourth connecting member 2-1054, respectively.

In addition, the optical system 2-100 may further include a first elastic element 2-106 and a second elastic element 2-110, and the base 2-112 may include four protruding columns 2-1123. The outer portion (the outer ring portion) of the first elastic element 2-106 is fixedly disposed on the top surfaces of the protruding columns 2-1123, the outer portion (the outer ring portion) of the second elastic element 2-110 is fixedly disposed on a plane 2-1125 of each of the protruding columns 2-1123, and the inner portions (the inner ring portions) of the first elastic element 2-106 and the second elastic element 2-110 are respectively connected to the upper and lower sides of the movable assembly 2-MA so that the first movable member 2-1081 to the fourth movable member 2-1084 are suspended in the accommodating space 2-1023.

In this embodiment, the driving module 2-DM may include four driving assemblies (a first driving assembly 2-DA1, a second driving assembly 2-DA2, a third driving assembly 2-DA3, and a fourth driving assembly 2-DA4). The first driving assembly 2-DA1 includes a first driving coil 2-CL1 and a first magnetic element 2-MG1, and the second driving assembly 2-DA2 includes a second driving coil 2-CL2 and a second magnetic element 2-MG2, the third driving assembly 2-DA3 includes a third driving coil 2-CL3 and a third magnetic element 2-MG3, and the fourth driving assembly 2-DA4 includes a fourth driving coil 2-CL4 and a fourth magnetic element 2-MG4.

In this embodiment, each magnetic element has a magnetic surface. For example, as shown in FIG. 2, the first magnetic element 2-MG1 and the second magnetic element 2-MG2 respectively have a first magnetic surface 2-MS1 and a second magnetic surface 2-MS2, the first magnetic surface 2-MS1 faces the first driving coil 2-CL1, the second magnetic surface 2-MS2 faces the second driving coil 2-CL2, and the first magnetic surface 2-MS1 and the second magnetic surface 2-MS2 face different directions.

In this embodiment, as shown in FIG. 2, the frame 2-104 has a plurality of grooves 2-1041 and a central opening 2-1043. In this embodiment, the frame 2-104 has four grooves 2-1041 configured to receive the four magnetic elements, but the number of the grooves 2-1041 and the magnetic elements is not limited to this embodiment. The central opening 2-1043 is configured to accommodate the first driving coil 2-CL1 to the fourth driving coil 2-CL4 and the first movable member 2-1081 to the fourth movable member 2-1084.

In this embodiment, the first driving coil 2-CL1 to the fourth driving coil 2-CL4 may be winding coils, which are respectively disposed on the first movable member 2-1081 to the fourth movable member 2-1084, and when the first driving coil 2-CL1 to the fourth driving coil 2-CL4 are provided with electricity, they can respectively act with the first magnetic element 2-MG1 to the fourth magnetic element 2-MG4 to generate an electromagnetic driving force to drive at least one of the first movable member 2-1081 to the fourth movable member 2-1084 to move relative to the base 2-112 and the frame 2-104 along the optical axis 2-O (the Z-axis) so as to perform functions of auto focusing or optical image stabilization.

The driving assembly of the driving module 2-DM can actuate individually or cooperatively. For example, the first driving assembly 2-DA1 is configured to drive the first movable member 2-1081 to move relative to the fixed assembly 2-FA, and the second driving assembly 2-DA2 is configured to drive the second movable member 2-1082 to move relative to the fixed assembly 2-FA and the first movable member 2-1081, and so on.

Furthermore, as shown in FIG. 2, in this embodiment, the fixed assembly 2-FA may further include at least one circuit member 2-170 configured to be electrically connected to the driving module 2-DM through the first elastic element 2-106 or the second elastic element 2-110. The circuit member 2-170 may be implemented by insert molding technology, but it is not limited thereto. In addition, the circuit member 2-170, the first elastic element 2-106 and the second elastic element 2-110 may constitute a circuit assembly.

Figure 4:
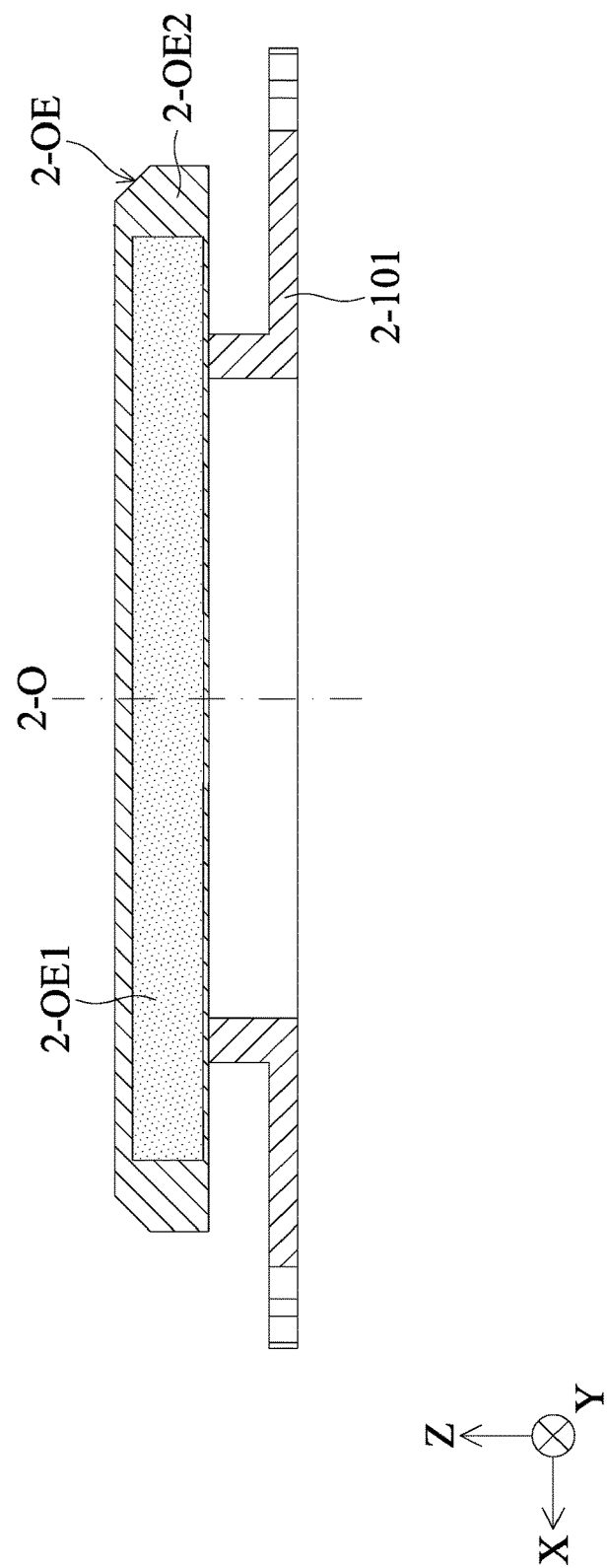
FIG. 4 is a schematic diagram illustrating that the first optical element 2-OE is not pushed by the deforming member 2-101 according to an embodiment of the present disclosure.
Figure 5:
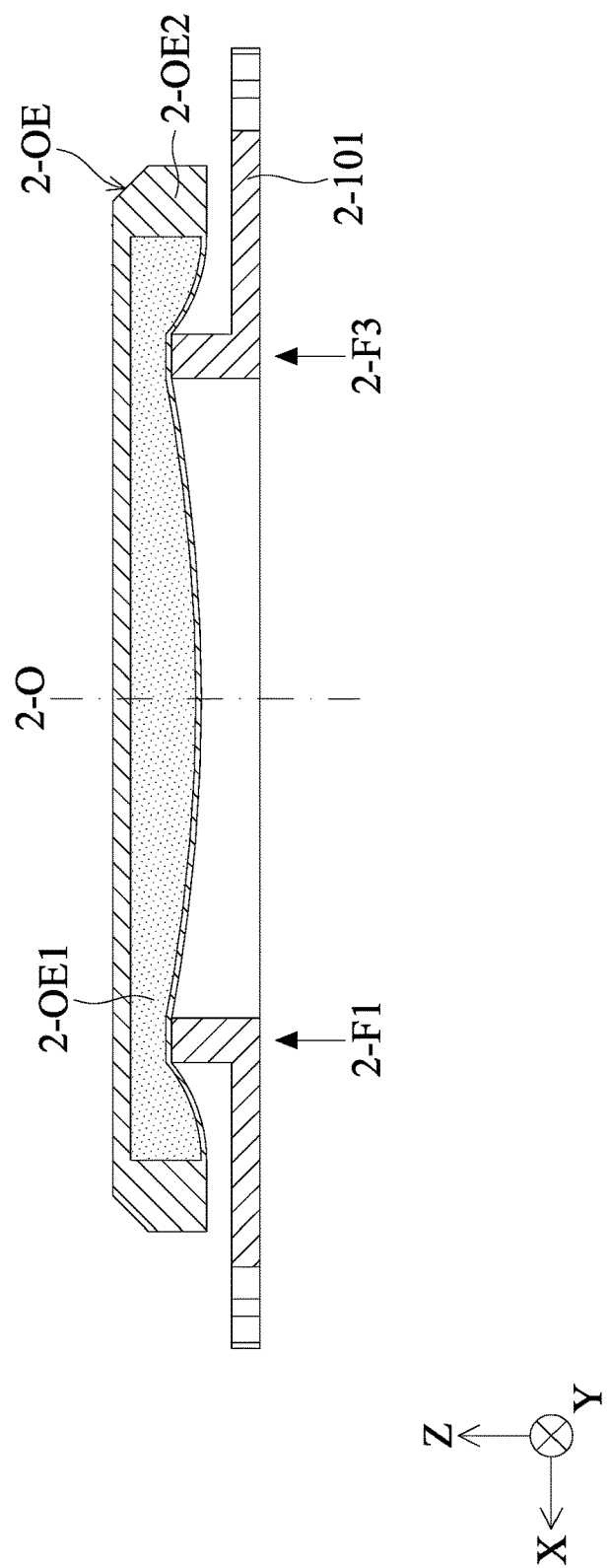
FIG. 5 and FIG. 6 are schematic diagrams of the first optical element 2-OE after being pushed by the deforming member 2-101 according to an embodiment of the present disclosure.
Figure 6:
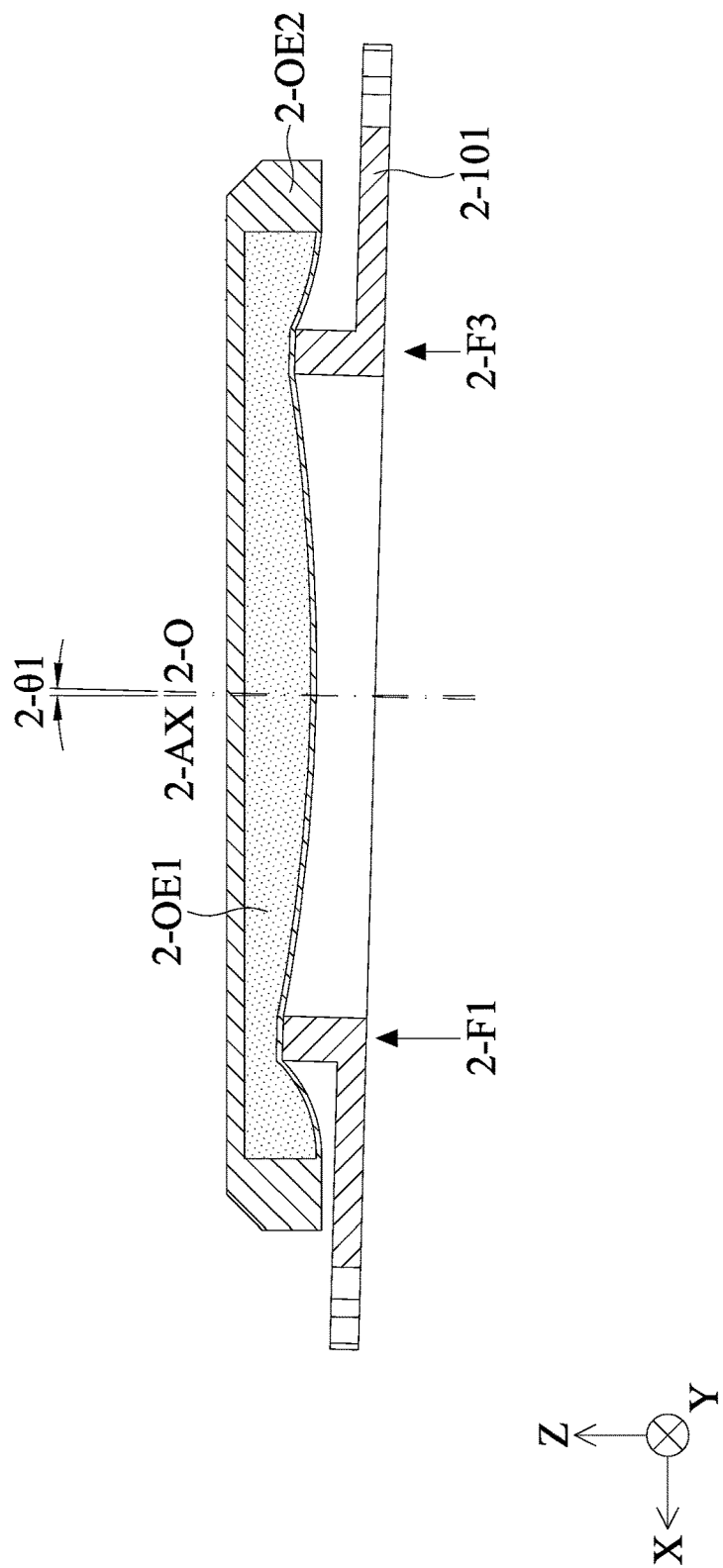

Next, please refer to FIG. 4 to FIG. 6. FIG. 4 is a schematic diagram illustrating that the first optical element 2-OE is not pushed by the deforming member 2-101 according to an embodiment of the present disclosure, and FIG. 5 and FIG. 6 are schematic diagrams of the first optical element 2-OE after being pushed by the deforming member 2-101 according to an embodiment of the present disclosure. As shown in FIG. 4, the first optical element 2-OE may be a liquid lens, including a liquid lens element 2-OE1 and a fixed member 2-OE2. The liquid lens element 2-OE1 is disposed within of the fixed member 2-OE2 having a hollow structure that protects and supports the liquid lens element 2-OE1. The deforming member 2-101 is disposed under the liquid lens element 2-OE1 and the fixed member 2-OE2. The bottom of the fixed member 2-OE2 may be a thin film, so that the deforming member 2-101 may be used for changing the shape of the liquid lens element 2-OE1.

FIG. 4 shows that the liquid lens element 2-OE1 is not deformed and the deforming member 2-101 is in an initial position, and the liquid lens element 2-OE1 has an optical axis 2-O. When the driving module 2-DM drives the movable assembly 2-MA to move, for example, applying a driving current to the driving coils of the driving module 2-DM, a magnetic force is generated between the driving coils and the corresponding magnetic elements, so that the movable assembly 2-MA is driven to move through the magnetic force and to force the deforming member 2-101 though the connecting assembly 2-CA to press the lower side of the liquid lens element 2-OE1. Therefore the liquid lens element 2-OE1 is deformed.

As shown in FIG. 2 and FIG. 5, when the first driving assembly 2-DA1 and the third driving assembly 2-DA3 of the driving module 2-DM provide pushing forces 2-F1, 2-F3 of the same magnitude, the deforming member 2-101 translates along the optical axis 2-O. At this time, the lens curvature of the liquid lens element 2-OE1 is changed from the curvature of the liquid lens element 2-OE1 in FIG. 4.

That is, the shape of the liquid lens element 2-OE1 is changed. Therefore, the optical properties of the liquid lens element 2-OE1 can be changed, thereby achieving an optical zoom, focus or shock-proofing effect.

Similarly, referring to FIG. 6, when the driving module 2-DM drives the deforming member 2-101 with a tilted movement, as illustrated in FIG. 6, the deforming member 2-101 obliquely moves and provides an unequal amount of pushing forces 2-F1 and 2-F3 to two different sides of the liquid lens element 2-OE1, so that the optical axis 2-O of the liquid lens element 2-OE1 is rotated and is deviated from the main axis 2-AX. That is, there is an angle 2-θ1 formed between them. Therefore, the optical properties of the liquid lens element 2-OE1 are changed, and the optical zoom, focusing or shock-proofing effect can be accomplished.

Figure 7:
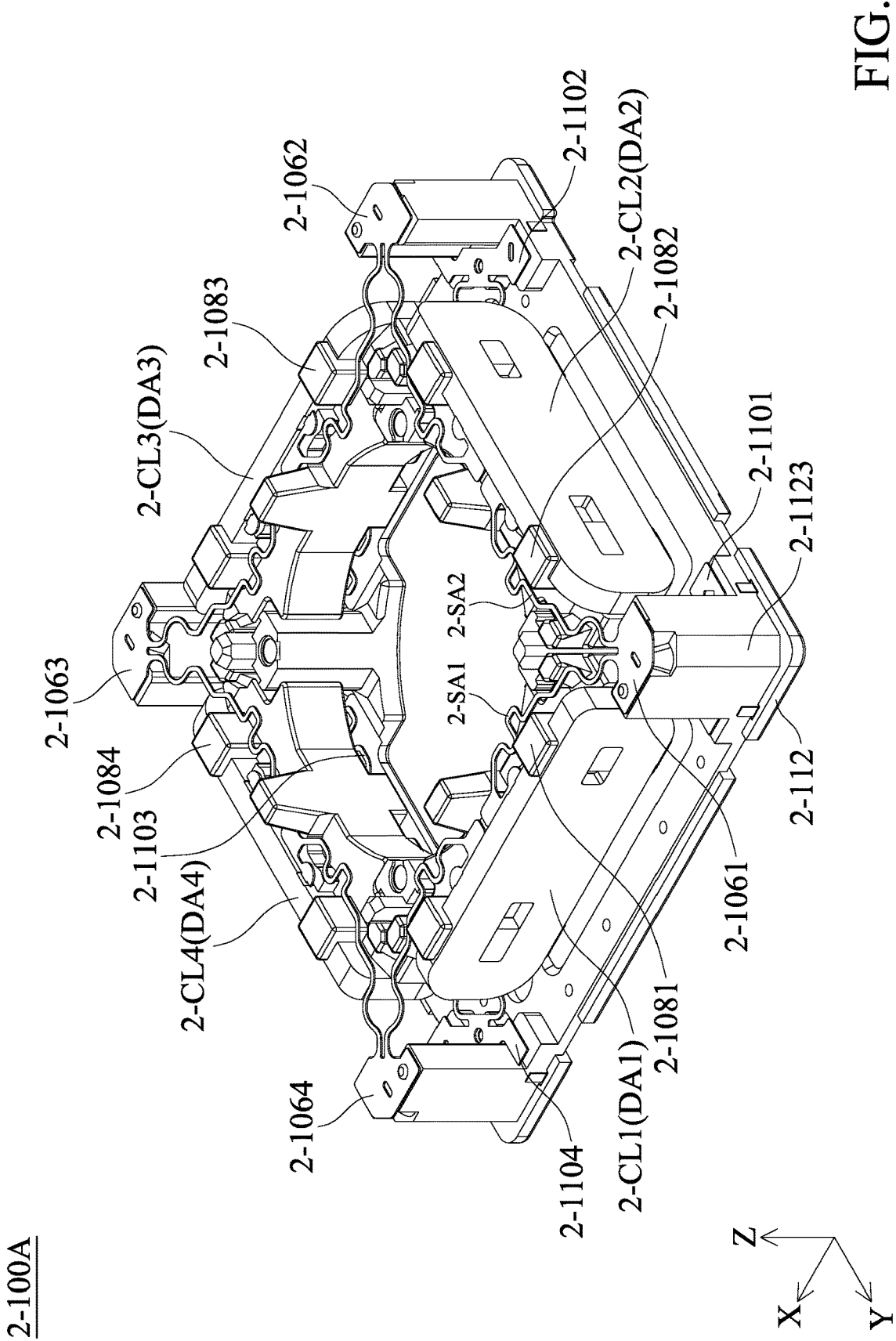
FIG. 7 is a schematic perspective view of a part of the structure of an optical system 2-100A according to another embodiment of the present disclosure.

Next, please refer to FIG. 7, which is a schematic perspective view of a part of the structure of an optical system 2-100A according to another embodiment of the present disclosure. In this embodiment, the first elastic element 2-106 may include four conductive elements 2-1061 to 2-1064, and the second elastic element 2-110 may include four conductive elements 2-1101 to 2-1104.

As shown in FIG. 7, the first driving coil 2-CL1 of the first driving assembly 2-DA1 is electrically connected to the second driving coil 2-CL2 of the second driving assembly 2-DA2 via the conductive element 2-1061 (the first conductive element) of the circuit assembly. Specifically, the conductive element 2-1061 (the first conductive element) has a first string arm 2-SA1 and a second string arm 2-SA2, which are respectively connected to the first driving coil 2-CL1 of the first driving assembly 2-DA1 and the second driving coil 2-CL2 of the second driving assembly 2-DA2.

In addition, the protruding column 2-1123 of the base 2-112 is located between the first driving coil 2-CL1 and the second driving coil 2-CL2, and the conductive element 2-1061 (the first conductive element) is connected to the protruding column 2-1123. For example, the conductive element 2-1061 is fixed to the protruding column 2-1123 by glue or solder.

As shown in FIG. 7, the first driving coil 2-CL1 of the first driving assembly 2-DA1 can also be electrically connected to the second driving coil 2-CL2 of the second driving assembly 2-DA2 via the conductive element 2-1101 (the second conductive element), and the conductive element 2-1061 (the first conductive element) and the conductive element 2-1101 (the second conductive element) are respectively disposed at two sides of the first driving assembly 2-DA1 and the second driving assembly 2-DA2, such as being disposed at the upper side and the lower side of the first driving assembly 2-DA1 and the second driving assembly 2-DA2 in the Z-axis.

Furthermore, the first movable member 2-1081 of the movable assembly 2-MA is movably connected to the protruding column 2-1123 of the fixed assembly 2-FA by the aforementioned first and second conductive elements, but it is not limited thereto. In other embodiments of the present disclosure, the movable assembly 2-MA may also be movably connected to the protruding column 2-1123 of the fixed assembly 2-FA only by the aforementioned first conductive element.

Similarly, the second driving coil 2-CL2 of the second driving assembly 2-DA2 can be electrically connected to the third driving coil 2-CL3 of the third driving assembly 2-DA3 via the conductive element 2-1062 (the third conductive element), and the second driving coil 2-CL2 of the second driving assembly 2-DA2 can also be electrically connected to the third driving coil 2-CL3 of the third driving assembly 2-DA3 via the conductive element 2-1102 (the fourth conductive element). The aforementioned third and fourth conductive elements are respectively disposed at the upper side and the lower side of the second driving assembly 2-DA2 and the third driving assembly 2-DA3 (along the Z-axis).

Figure 8:
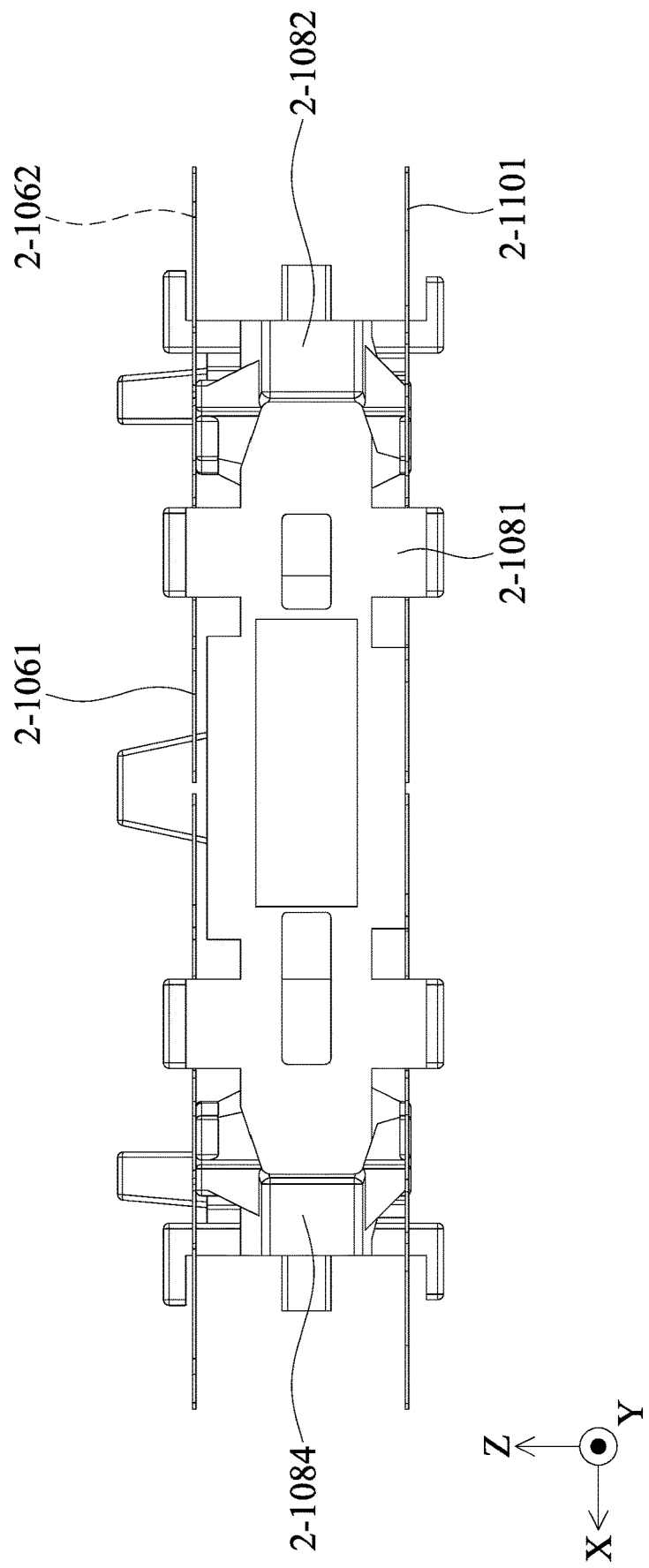
FIG. 8 is a schematic diagram of a partial structure of the optical system 2-100A according to another embodiment of the present disclosure.

Please continue to refer to FIG. 7 and FIG. 8. FIG. 8 is a schematic diagram of a partial structure of the optical system 2-100A according to another embodiment of the present disclosure. The aforementioned conductive elements (such as the first and third conductive elements) all have a plate-shaped structure, and when viewed along an extending direction of the conductive element 2-1061 (such as along the Y-axis), the conductive element 2-1061 (the first conductive element) at least partially overlaps the conductive element 2-1062 (the third conductive element). In this embodiment, the conductive element 2-1061 (the first conductive element) overlaps the conductive element 2-1062 (the third conductive element).

Figure 9:
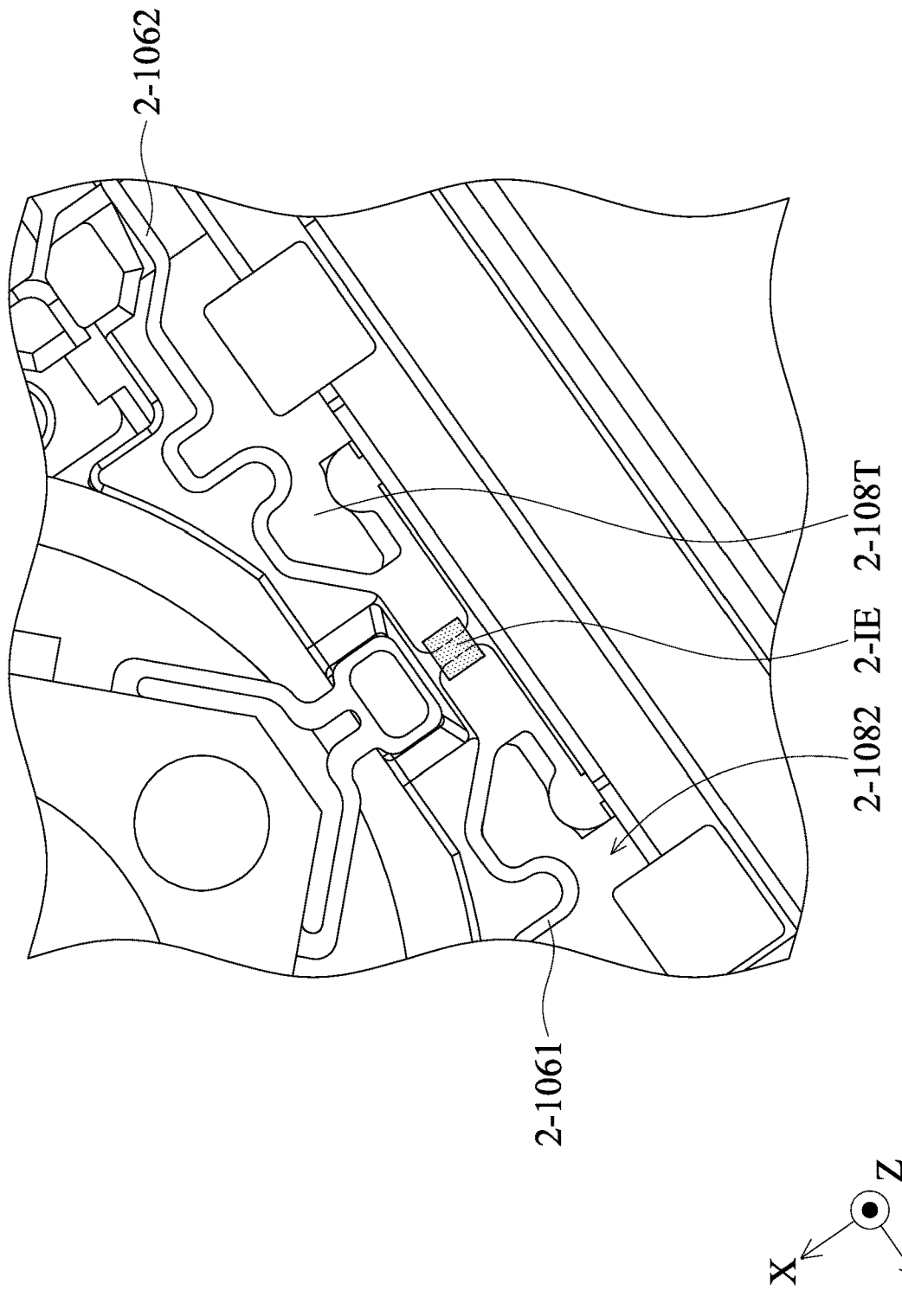
FIG. 9 is an enlarged diagram of a partial structure of the optical system 2-100A according to another embodiment of the present disclosure.

Please refer to FIG. 9, which is an enlarged diagram of a partial structure of the optical system 2-100A according to another embodiment of the present disclosure. The conductive element 2-1061 (the first conductive element) and the conductive element 2-1062 (the third conductive element) are disposed on a top surface 2-108T of the second movable member 2-1082 of the movable assembly 2-MA, and when viewed in the direction of the main axis 2-AX (the Z-axis), the conductive element 2-1061 (the first conductive element) does not overlap the conductive element 2-1062 (the third conductive element).

Furthermore, in this embodiment, the optical system 2-100A may further include an insulating element 2-IE, which is disposed between the conductive element 2-1061 (the first conductive element) and the conductive element 2-1062 (the third conductive element). In this embodiment, the insulating element 2-IE may be a glue configured to connect the conductive element 2-1061 (the first conductive element), the conductive element 2-1062 (the third conductive element), and the second movable member 2-1082 of the movable assembly 2-MA, as shown in FIG. 9. The insulating element 2-IE can be used to fix the end portions of the conductive element 2-1061 (the first conductive element) and the conductive element 2-1062 (the third conductive element) to the second movable member 2-1082, and it can cause the conductive element 2-1061 (the first conductive element) being electrically independent from the conductive element 2-1062 (the third conductive element).

Figure 10:
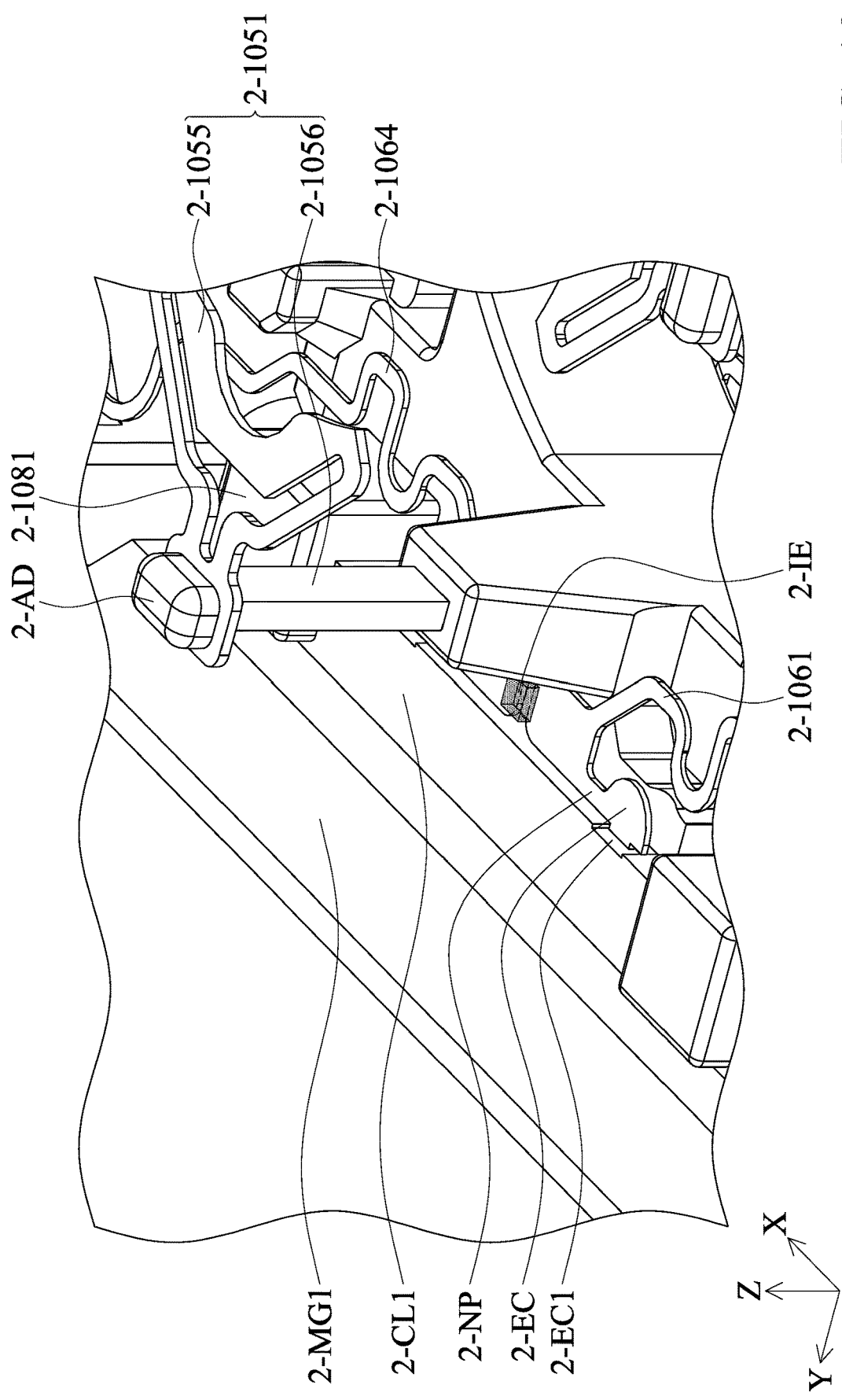
FIG. 10 is an enlarged diagram of a part of the structure of the optical system 2-100A in another view according to another embodiment of the present disclosure.

Please refer to FIG. 10, which is an enlarged diagram of a part of the structure of the optical system 2-100A in another view according to another embodiment of the present disclosure. The optical system 2-100A is similar to the optical system 2-100. The difference between them is that each connecting member of the optical system 2-100A can have an elastic portion and a rigid portion. For example, the first connecting member 2-1051 may have an elastic portion 2-1055 and a rigid portion 2-1056, and the rigid portion 2-1056 is connected to the elastic portion 2-1055 by an adhesive member 2-AD. The rigid portion 2-1056 is connected between the elastic portion 2-1055 and the first movable member 2-1081.

Furthermore, as shown in FIG. 10, the conductive element 2-1061 (the first conductive element) has an electrical contact 2-EC and a narrow portion 2-NP. The electrical contact 2-EC is configured to be electrically connected to an electrical contact 2-EC1 of the first driving coil 2-CL1 of the first driving assembly 2-DA1, for example, by welding. The narrow portion 2-NP is adjacent to the electrical contact 2-EC, and the design of the narrow portion 2-NP can reduce the heat transfer during welding to prevent the first movable member 2-1081 from being damaged and can allow the thermal energy to be concentrated on the electrical contact 2-EC so as to facilitate melt of the solder more reliably, so that the solder can be set more securely.

Figure 11:
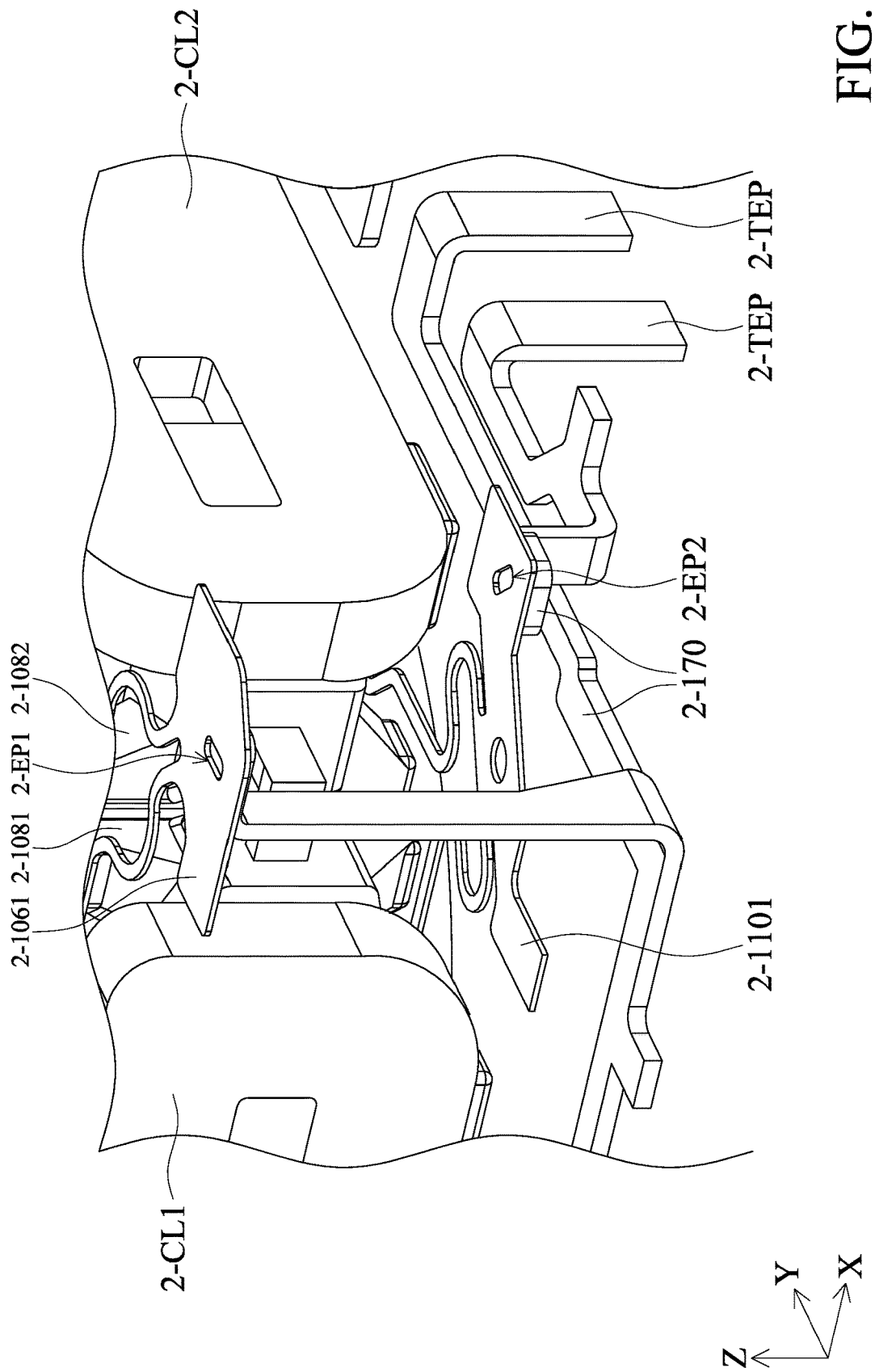
FIG. 11 is an enlarged diagram of the optical system 2-100A after removing the base 2-112 according to an embodiment of the present disclosure.

Please refer to FIG. 11, which is an enlarged diagram of the optical system 2-100A after removing the base 2-112 according to an embodiment of the present disclosure. In this embodiment, the conductive element 2-1061 (the first conductive element) and the conductive element 2-1101 (the second conductive element) can be electrically connected to an external electrical connection portion 2-TEP through the circuit member 2-170 which is embedded in the base 2-112, for example, by welding.

Specifically, as shown in FIG. 11, the conductive element 2-1061 (the first conductive element) is electrically connected to the circuit member 2-170 through a first electrical connecting point 2-EP1, and the conductive element 2-1101 (the second conductive element) is electrically connected to the circuit member 2-170 through a second electrical connecting point 2-EP2. In addition, the shortest distance between the first electrical connecting point 2-EP1 and the first optical element 2-OE is different from the shortest distance between the second electrical connecting point 2-EP2 and the first optical element 2-OE. That is, the distance between the first electrical connecting point 2-EP1 and the first optical element 2-OE along the main axis 2-AX is smaller than the distance between the second electrical connecting point 2-EP2 and the first optical element 2-OE.

Figure 12:
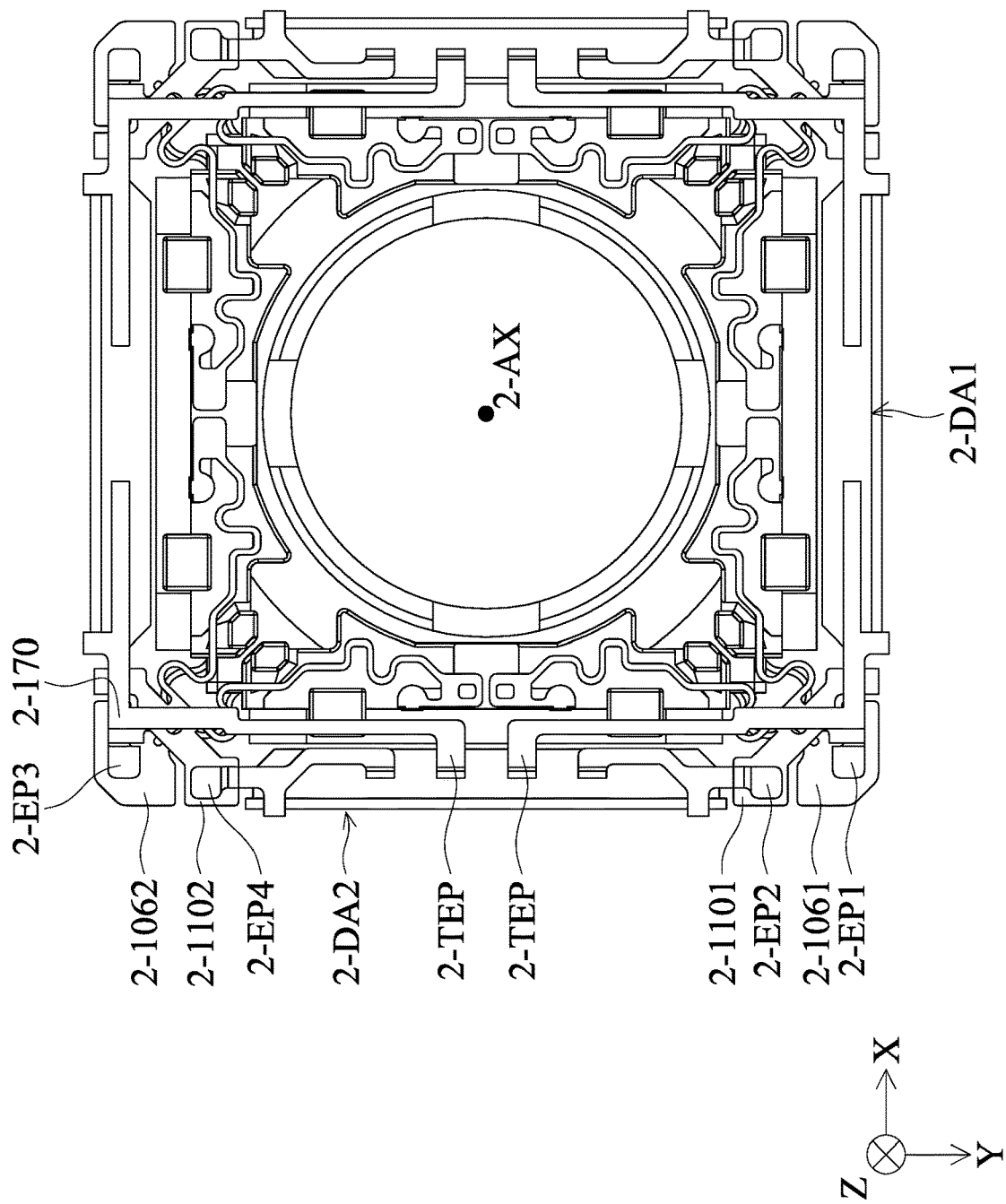
FIG. 12 is a bottom view of the of the optical system 2-100A after removing the base 2-112 according to another embodiment of the present disclosure.

Next, please refer to FIG. 12, which is a bottom view of the of the optical system 2-100A after removing the base 2-112 according to another embodiment of the present disclosure. When viewed along the main axis 2-AX, the second driving assembly 2-DA2 overlaps the external electrical connection portion 2-TEP, and the first driving assembly 2-DA1 does not overlap the external electrical connection portion 2-TEP. The external electrical connection portion 2-TEP is a pin exposed from the base 2-112.

In this embodiment, the circuit member 2-170 may constitute a polygonal structure, such as a rectangular structure in FIG. 12. Furthermore, the conductive element 2-1062 (the third conductive element) is electrically connected to the circuit member 2-170 through a third electrical connecting point 2-EP3, the conductive element 2-1102 (the fourth conductive element) is electrically connected to the circuit member 2-170 through a fourth electrical connecting point 2-EP4, and the aforementioned second electrical connecting point 2-EP2 and the fourth electrical connecting point 2-EP4 are disposed on one side of the circuit member 2-170, such as on the left.

It should be noted that when viewed along the main axis 2-AX, the aforementioned second electrical connecting point 2-EP2 and the fourth electrical connecting point 2-EP4 are located between the aforementioned first electrical connecting point 2-EP1 and the third electrical connecting point 2-EP3.

Figure 13:
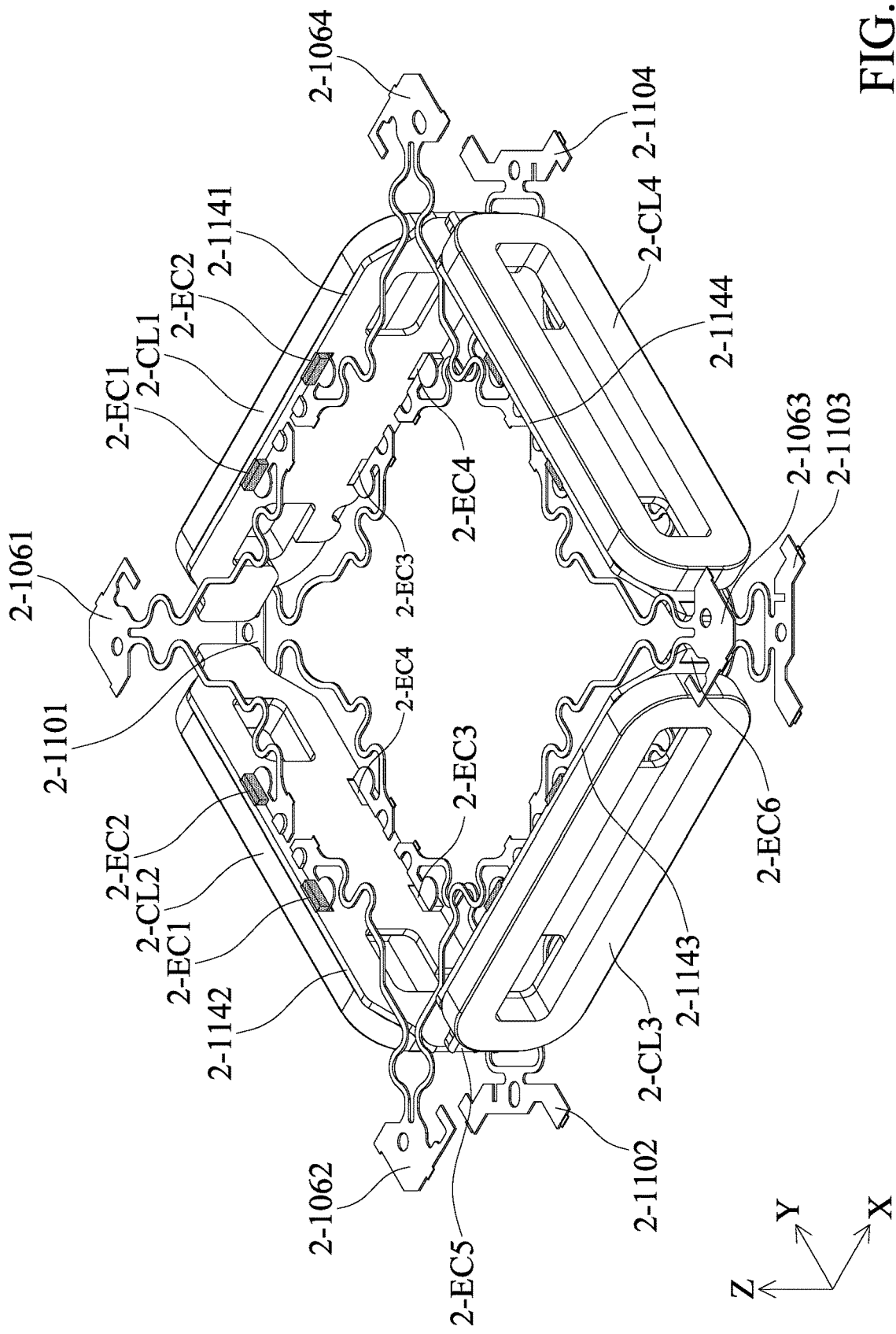
FIG. 13 is a schematic diagram of a part of a structure of an optical system according to another embodiment of the present disclosure.

Please refer to FIG. 13, which is a schematic diagram of a part of a structure of an optical system according to another embodiment of the present disclosure. In this embodiment, each driving assembly may further include a flexible circuit board. For example, the first driving assembly 2-DA1 to the fourth driving assembly 2-DA4 may have circuit boards 2-1141 to 2-1144 respectively, and each circuit board may have six electrical contacts 2-EC1 to 2-EC6.

In this embodiment, the electrical contact 2-EC1 and the electrical contact 2-EC2 of the circuit board 2-1141 are electrically connected to a positive voltage and a negative voltage, respectively. The electrical contact 2-EC3 and the electrical contact 2-EC4 of the circuit board 2-1141 are electrically connected to a data signal and a clock signal, respectively, and the electrical contact 2-EC5 and the electrical contact 2-EC6 respectively output a first output signal and a second output signal.

Because the circuit board 2-1141 and the circuit board 2-1142 share the conductive element 2-1061 and the conductive element 2-1101, the electrical contact 2-EC2 of the circuit board 2-1142 is electrically connected to the positive voltage, and the electrical contact 2-EC4 of the circuit board 2-1142 is electrically connected to the data signal. Similarly, because the circuit board 2-1142 and the circuit board 2-1143 share the conductive element 2-1062 and the conductive element 2-1102, the electrical contact 2-EC1 of the circuit board 2-1142 is electrically connected to the negative voltage. The electrical contact 2-EC3 of the circuit board 2-1142 is electrically connected to the clock signal, and the electrical contact 2-EC5 and the electrical contact 2-EC6 of the circuit board 2-1142 respectively output the second output signal and the first output signal.

That is, the circuit layout of the circuit board 2-1141 (the first circuit element) is different from the circuit layout of the circuit board 2-1142 (the second circuit element). For example, the circuit layout of the circuit board 2-1141 is symmetrical to the circuit layout of the circuit board 2-1142.

The present disclosure provides an optical system having a first optical element 2-OE, a deforming member 2-101, a movable element 2-103, a fixed assembly 2-FA, a connecting assembly 2-CA, a movable assembly 2-MA, and a driving module 2-DM. The movable element 2-103 is configured to be connected to the first optical element 2-OE through the deforming member 2-101, and the movable assembly 2-MA is connected to the movable element 2-103 through the connecting assembly 2-CA. When driving module 2-DM is configured to drive movable assembly 2-MA to move relative to fixed assembly 2-FA, the movable element 2-103 can be moved to drive the deforming member 2-101 to push the bottom of first optical element 2-OE, thereby changing the optical properties of the liquid lens element 2-OE1.

In addition, the circuit layouts of adjacent circuit boards in the driving assembly are symmetrical, and adjacent movable members in movable assembly 2-MA can share conductive elements, so that the optical system of the present disclosure can achieve simplified mechanism design and the purpose of miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a fixed assembly, having a main axis;
a first optical element, disposed on the fixed assembly;
a deforming member;
a movable element, movable relative to the fixed assembly and connected to the first optical element through the deforming member; and
a driving module, configured to drive the movable element to move relative to the fixed assembly,
wherein the driving module includes a first driving assembly and a second driving assembly, and the first driving assembly and the second driving assembly are individually operable,
wherein the optical system further comprises a circuit assembly, and the first driving assembly is electrically connected to the second driving assembly via a first conductive element of the circuit assembly,
wherein the first conductive element has a first string arm and a second string arm which are respectively physically and directly connected to and electrically connected to the first driving assembly and the second driving assembly,
wherein the fixed assembly includes a base, the base has a protruding column, and the first conductive element is connected to the protruding column, and
wherein when viewed along the main axis, the protruding column is covered by the first conductive element.

2. The optical system as claimed in claim 1, wherein the optical system further comprises a movable assembly, the driving module drives the movable assembly to move relative to the fixed assembly so as to move the movable element, and the movable assembly is movably connected to the fixed assembly by the first conductive element.

3. The optical system as claimed in claim 1, wherein the circuit assembly further includes a second conductive element, the first driving assembly is electrically connected to the second driving assembly via the second conductive element, and the first conductive element and the second conductive element are respectively disposed at two sides of the first driving assembly and the second driving assembly.

4. The optical system as claimed in claim 3, wherein the optical system further comprises a movable assembly, the driving module drives the movable assembly to move relative to the fixed assembly so as to move the movable element, and the movable assembly is movably connected to the fixed assembly by the first conductive element and the second conductive element.

5. The optical system as claimed in claim 3, wherein the circuit assembly further includes a circuit member, and the first conductive element and the second conductive element are electrically connected to an external electrical connection portion through the circuit member.

6. The optical system as claimed in claim 5, wherein the first conductive element is electrically connected to the circuit member through a first electrical connecting point, the second conductive element is electrically connected to the circuit member through a second electrical connecting point, and a shortest distance between the first electrical connecting point and the first optical element is different from a shortest distance between the second electrical connecting point and the first optical element.

7. The optical system as claimed in claim 5, wherein when viewed along the main axis, the second driving assembly overlaps the external electrical connection portion, and the first driving assembly does not overlap the external electrical connection portion.

8. The optical system as claimed in claim 3, wherein the driving module further includes a third driving assembly, the circuit assembly further includes a third conductive element, and the second driving assembly is electrically connected to the third driving assembly via the third conductive element.

9. The optical system as claimed in claim 8, wherein each of the first and third conductive elements has a plate-shaped structure, and when viewed along an extending direction of the first conductive element, the first conductive element at least partially overlaps the third conductive element.

10. The optical system as claimed in claim 8, wherein the circuit assembly further includes a fourth conductive element, the second driving assembly is electrically connected to the third driving assembly via the fourth conductive element, and the third and fourth conductive elements are respectively disposed at two sides of the second driving assembly and the third driving assembly.

11. The optical system as claimed in claim 10, wherein the circuit assembly includes a circuit member with a polygonal structure, the first conductive element is electrically connected to the circuit member through a first electrical connecting point, the second conductive element is electrically connected to the circuit member through a second electrical connecting point, the third conductive element is electrically connected to the circuit member through a third electrical connecting point, the fourth conductive element is electrically connected to the circuit member through a fourth electrical connecting point, and the second electrical connecting point and the fourth electrical connecting point are disposed on one side of the circuit member.

12. The optical system as claimed in claim 11, wherein when viewed along the main axis, the second electrical connecting point and the fourth electrical connecting point are located between the first electrical connecting point and the third electrical connecting point.

13. The optical system as claimed in claim 8, wherein the optical system further comprises a movable assembly, the first conductive element and the third conductive element are disposed on a top surface of the movable assembly, and when viewed along the main axis, the first conductive element does not overlap the third conductive element.

14. The optical system as claimed in claim 13, wherein the first conductive element has an electrical contact and a narrow portion, the electrical contact is configured to be electrically connected to the first driving assembly, and the narrow portion is adjacent to the electrical contact.

15. The optical system as claimed in claim 13, wherein the optical system further comprises an insulating element which is disposed between the first conductive element and the third conductive element.

16. The optical system as claimed in claim 15, wherein the insulating element is a glue configured to connect the first conductive element, the third conductive element and the movable assembly.

17. The optical system as claimed in claim 1, wherein the first driving assembly and the second driving assembly respectively include a first circuit element and a second circuit element, and a circuit layout of the first circuit element is different from a circuit layout of the second circuit element.

18. An optical system, comprising:
a fixed assembly, having a main axis;
a first optical element, disposed on the fixed assembly;
a deforming member;
a movable element, movable relative to the fixed assembly and connected to the first optical element through the deforming member; and
a driving module, configured to drive the movable element to move relative to the fixed assembly,
wherein the driving module includes a first driving assembly and a second driving assembly, and the first driving assembly and the second driving assembly are individually operable,
wherein the optical system further comprises a circuit assembly, and the first driving assembly is electrically connected to the second driving assembly via a first conductive element of the circuit assembly,
wherein the first conductive element has a first string arm and a second string arm which are respectively connected to the first driving assembly and the second driving assembly,
wherein the circuit assembly further includes a second conductive element, the first driving assembly is electrically connected to the second driving assembly via the second conductive element, and the first conductive element and the second conductive element are respectively disposed at two sides of the first driving assembly and the second driving assembly,
wherein the circuit assembly further includes a circuit member, and the first conductive element and the second conductive element are electrically connected to an external electrical connection portion through the circuit member, and
wherein the first conductive element is electrically connected to the circuit member through a first electrical connecting point, the second conductive element is electrically connected to the circuit member through a second electrical connecting point, and a shortest distance between the first electrical connecting point and the first optical element is different from a shortest distance between the second electrical connecting point and the first optical element.

* * * * *